United States Patent [19]

Grubelich

[11] 4,104,120

[45] Aug. 1, 1978

[54] STATIC FUEL HOLDDOWN SYSTEM

[75] Inventor: Francis Thomas Grubelich, Wethersfield, Conn.

[73] Assignee: Combustion Engineering, Inc., Windsor, Conn.

[21] Appl. No.: 760,881

[22] Filed: Jan. 21, 1977

[51] Int. Cl.² ............................................. G21C 3/30
[52] U.S. Cl. ....................................... 176/50; 176/78; 176/87
[58] Field of Search ...................... 176/50, 61, 54, 55, 176/87, 78, 83, 49

[56] References Cited

U.S. PATENT DOCUMENTS

| 3,121,666 | 2/1964 | Wheelock | 176/61 |
| 3,389,054 | 6/1968 | Kovacic | 176/49 |
| 3,527,669 | 9/1970 | Bettis | 176/49 |

Primary Examiner—Harvey E. Behrend
Attorney, Agent, or Firm—Joseph H. Born; Richard H. Berneike

[57] ABSTRACT

A holddown column for preventing upstream motion of nuclear-reactor fuel assemblies during operation of the reactor is disclosed. The holddown column is a composite of three concentric individual columns. Lips on the intermediate column engage the other two columns so that the intermediate column expands under load as the other two columns contract. This results in a greater deflection of the column under load than would result if the column were only a single column, but the thermal expansion experienced by the composite column is not different from the thermal expansion experienced by a simple column of the same material and length.

6 Claims, 2 Drawing Figures

STATIC FUEL HOLDDOWN SYSTEM

BACKGROUND OF THE INVENTION

In Anthony, Ser. No. 708,514, a prior application assigned to applicant's assignee, a fuel-assembly holddown system is disclosed in which a center column is used to transmit holddown force from an upper core plate positioned above the fuel assembly to the upper surface of the lower end fitting of the fuel assembly, the lower end fitting being the part that forms the lower surface of the fuel assembly. Among the advantages of that invention is that the column employed to transmit holddown force is made of the same material as the core barrel. Since the materials are the same, the thermal expansion that causes variations in the distance between the upper core plate and the lower core plate, upon which the lower end fitting rests, is rather closely matched by thermal variations in the holddown column. Since these variations are matched, the apparatus provides an advantage in the design of the accompanying fuel assemblies, since provision had to be made in the prior-art fuel-assembly designs to accommodate the difference in length variation between the core-plate-to-core-plate distance and the fuel-assembly length. This advantage allows the use of smaller springs because the length-difference changes to be accommodated are smaller than those to be accommodated in the prior-art systems.

Springs were nonetheless included in the preferred embodiment of Anthony since the complete removal of the springs would necessitate that all distance variations would have to be made up for by compression due to preloading of the holddown column. Since the amount of compression that a simple column will undergo in response to a normal amount of preloading is rather small, conservative designs include springs in order to accommodate length variations that the initial compression of the column may not be sufficient to absorb.

SUMMARY OF THE INVENTION

It is accordingly an object of the present invention to provide a composite holddown column that undergoes more compression under a given load than does a simple column of the same material yet retains the same rate of thermal expansion as a simple column. Such a column retains the advantages afforded by a holddown column with the same thermal-expansion coefficient as the core barrel, but it also provides the potential for eliminating the use of springs.

According to the present invention, a composite column is made of at least three concentric individual columns. In the composite column, the top of each intermediate column engages the top of one column adjacent to it, while the bottom of each intermediate column engages the bottom of the other adjacent column. The result is that alternate columns compress and expand when the column is loaded, causing their deflections to be additive. This multiplies the amount of compression caused by a given load. The effect of heat, on the other hand, is to cause all columns to respond in the same way to an increase in temperature; that is, if one column expands with temperature, the other columns also expand. This results in the expansions and contractions of overlapping cylinder lengths being cancelled, leaving a thermal variation equivalent to the variation that characterizes a single simple column of the same length and material as the composite column.

BRIEF DESCRIPTION OF THE DRAWINGS

These and further features and advantages of the invention become evident in the description of the embodiment shown in the attached drawings, wherein.

DETAILED DESCRIPTION OF THE PREFERRED EMBODIMENT

Figures 1, 2:
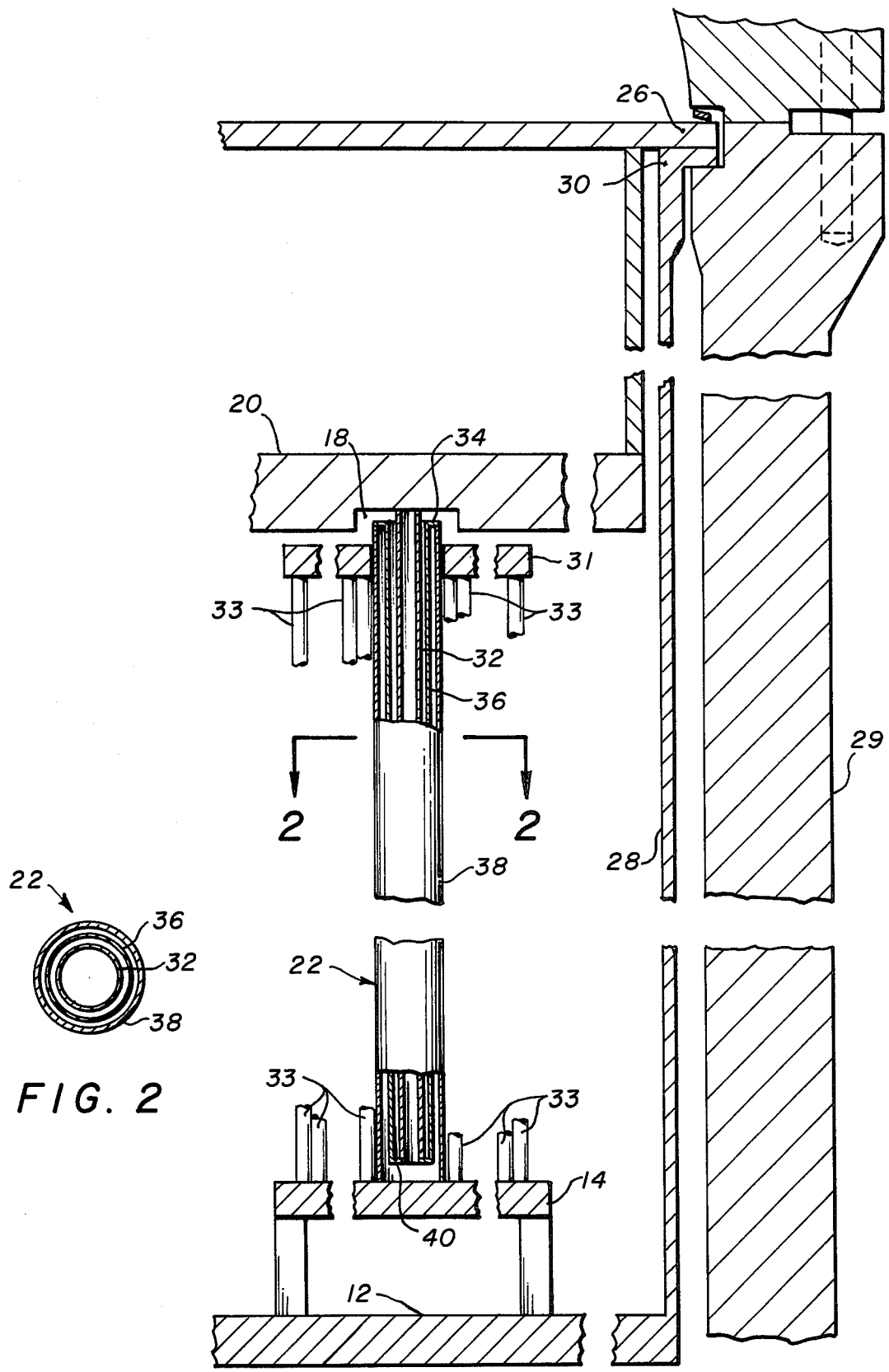
FIG. 1 is a simplified diagram of the position of a fuel assembly within a nuclear-reactor pressure vessel.
FIG. 2 is a cross-sectional view of a column according to the present invention taken at Line 2—2 of FIG. 1.

FIG. 1 shows the manner in which the present invention is employed to secure a nuclear-reactor fuel assembly against motion caused by, among other things, the upward flow of liquid coolant. A fuel assembly rests on lower core plate 12, shown in FIG. 1. For the sake of simplicity, the fuel-assembly structure and fuel pins are not fully shown in FIG. 1, but fuel pins 33 are ordinarily arranged vertically, resting on lower end fitting 14 and being spaced and supported by structural parts such as 31. According to Anthony, a holddown column 22 is used to hold the fuel assembly in contact with lower core plate 12. It is to the particular structure of holddown column 22 that the present invention is directed. Holddown column 22 is attached to lower end fitting 14, and it is subjected to a compressive load by upper plate 20. Lower core plate 12 supports lower end fitting 14, preventing downward (upstream) motion of the fuel assembly. It is the function of upper core plate 20 to prevent upward (downstream) motion.

Lower core plate 12 is attached to cylindrical core barrel 28, which rests on pressure vessel 29 by means of core-barrel flange 30. Upper core plate 20 is a part of an upper guide structure that is held in place by upper-guide-structure flange 26. The upper guide structure is typically made of the same material as the core barrel and therefore has the same thermal coefficient of expansion. As a result, thermal expansion does not cause upper core plate 20 and core barrel 28 to move with respect to each other. This means that the variations in distance between upper core plate 20 and lower core plate 12 are caused by the thermal expansion of only that part of core barrel 28 between upper core plate 20 and lower core plate 12. Accordingly, if thermal expansions of holddown column 22 can track thermal expansions of that part of core barrel 28 between upper core plate 20 and lower core plate 12, then no additional provision need by made to ensure that contact is maintained between holddown column 22 and upper core plate 20. Accordingly, the Anthony specification teaches the use of the same material, typically stainless steel, in the holddown column as is used in the core barrel.

In practice, it is not possible for the temperature-induced length variations in holddown column 22 to exactly track those variations in the parallel section of core barrel 28. Even if the thermal coefficients of expansion of the two components are identical, holddown column 22 is normally hotter during reactor operation. In addition to thermal differences between the two components, manufacturing tolerances are such that it cannot always be guaranteed that the column under a given load will exactly fit the distance between lower end fitting 14 and recessed area 18 of upper core plate 20. The matching of lengths is further complicated by radiation effects, which introduce some slight dimensional variations in the stainless steel over the life of the fuel assembly. While it is conceivable that the upper-core-plate load on the column could cause sufficient compression in the column to absorb all these variations, the amount of load that would be required to cause sufficient compression to make up for all of the expected variations could well be too high in the case of a simple column. The composite column of FIG. 2 is offered as a means for reducing the amount of load required to produce the desired compression.

According to the present invention, a composite column 22 includes cylindrical inner column 32 which engages upper core plate 20 and extends most of the length of composite column 22. It rests on lip 40, located upstream of the upstream (lower) end of inner column 32. Lip 40 extends radially inward beyond the radial position of inner column 32 so as to prevent its upstream movement. Annular lip 40 is an annular raised surface on the lower end of cylindrical intermediate column 36, which has another annular raised surface, lip 34, formed on its downstream (upper) end. Lip 34 extends radially outward beyond the radial position of a third column, cylindrical outer column 38, thereby preventing downstream movement of column 38. When upper core plate 20 is lowered onto composite column 22, it engages the upper end of cylindrical inner column 32, and force is transmitted by lip 40 to intermediate column 36. Intermediate column 36 transmits the force by way of lip 34 to outer column 38, which in turn transmits the force to lower end fitting 14. The laws of statics suggest that compressive loads exist on columns 32 and 38 which are equal to each other and to a tension load on column 36. Thus, the height of the top of the column 38 is lower by an amount equal to the strain produced by the load multiplied by the length of the column. The bottom of column 36 is lowered not only by the product of the strain and the length of column 36 but also by the amount by which its top end is lowered, which is the amount by which the top end of column 38 is lowered. Similarly, the distance by which the top of column 32 is lowered is not merely the amount of compression of column 32 but the sum of that compression and the compression of column 38 and the expansion of column 36. It can be seen, therefore, that the amount of deformation of the composite column under a given load (assuming all of the tubes in the composite to be of a given cross-sectional area) will be equal to the amount of deformation that a simple column of the same cross-sectional area and equal in length to the combined length of the tubes in the composite column would undergo under the same given load. Stated another way, and again assuming all tubes to be of the same cross-sectional area, the amount of load that is required to produce a given deformation of the composite column is approximately one third the load that would be required to produce the same deformation of a simple column of the same length. This last approximation ignores the fact that the individual tubes in the composite are not equal in length to the overall length of the composite column. Accordingly, it is possible through the use of the FIG. 2 embodiment or an embodiment of the present invention having more than three simple columns to accommodate enough length variations to completely eliminate the need for springs.

This advantage in increased compression is afforded without affecting the favorable temperature coefficient of expansion of the simple column disclosed in the Anthony specification. The effect of expansion caused by temperature changes is different from that caused by loading of the column; all columns change in the same direction when temperatures change. Thus, the expansion of that part of column 32 that overlaps column 36 is cancelled by the expansion of column 36. This means that the expansion of the composite column is the sum of the expansion of column 34 plus the expansion of that part of column 32 that does not overlap the other column. In other words, the expansion of the composite column is equal to the expansion of a simple column of the same height.

Although only one embodiment of the present invention has been described in this application, many other embodiments will be apparent to those skilled in the art. In particular, while only three component columns are shown in the preferred embodiment, it is apparent that the principles of the present application apply equally to larger numbers of component columns. Additionally, while the columns of the instant specification are cylindrical, the word column in the claims is not meant to be limited to columns of cylindrical cross section. Accordingly, the present application is intended to embrace these and all embodiments apparent to those skilled in the art that fall within the scope of the appended claims.

What is claimed is:

1. In a nuclear reactor comprising at least one fuel assembly having fuel members and structural members for spacing and support of the fuel members, the fuel assembly being disposed longitudinally in a path of intended coolant flow, the intended coolant flow defining upstream and downstream directions, a means for preventing downstream motion of the fuel assembly, comprising:

a. a lower end fitting constituting the upstream end of the fuel assembly and connected to the rest of the fuel assembly so as to prevent relative downstream motion of the fuel assembly with respect to the lower end fitting;

b. a force-transmitting member, comprising:

(i) an inner column having an engagement end, the inner column extending longitudinally in one of the upstream and downstream directions from the engagement end of the inner column;

(ii) an intermediate column concentric with the inner column and hollow along at least a part of its length, which part encloses at least part of the inner column;

(iii) means for preventing movement of a point on the inner column with respect to a first point on the intermediate column when a compressive force is applied to the force-transmitting member, the remainder of the inner column being free to move with respect to the remainder of the intermediate column, simultaneous expansion of the intermediate column and compression of the inner column thereby being permitted;

(iv) an outer column concentric with the intermediate column and hollow along at least a part of its length, which part encloses at least part of the intermediate column, the outer column having an engagement end from which the outer column extends in a direction opposite to that in which the inner column extends; and (v) means for preventing movement of a point on the outer column with respect to a second point on the intermediate column, which second point is located on the intermediate column further in the direction in which the outer column extends than is the first point, when a compressive force is applied to the force-transmitting member, the remainder of the outer column being free to move with respect to the remainder of the intermediate column, simultaneous expansion of the intermediate column and compression of the outer column thereby being permitted; for transmitting to the lower end fitting a force applied to one of the engagement ends; and c. means for applying sufficient upstream force to the other engagement end to hold the fuel assembly in place against downstream force from the coolant, the upstream force thereby being applied through the outer, intermediate, and inner columns to the lower end fitting;

wherein the upstream and downstream movement of the force-transmitting member is restricted only by the lower end fitting and the upstream-force means.

2. An apparatus as recited in claim 1, wherein the nuclear reactor comprises a core barrel made of a material having a temperature coefficient of expansion and a lower core plate supported so as to remain stationary with respect to a first point on the core barrel, wherein the fuel assembly is located within the core barrel and oriented so that the lower core plate engages the lower end fitting to prevent upstream motion of the lower end fitting with respect to the lower core plate, and wherein the position of the means for applying an upstream force is determined by a second point on the core barrel, whereby the relative positions of the lower core plate and the means for applying an upstream force are determined by the distance between the first and second points on the core barrel, and wherein the force-transmitting member consists essentially of a material having the same temperature coefficient of expansion as that out of which the core barrel is made.

3. An apparatus as recited in claim 2, wherein the outer column comprises a column having an inner surface and a second end opposite its engagement end, the inner column comprises a column having an outer surface and a second end opposite its engagement end, the means for preventing movement of the outer column comprises a first lip located on the intermediate column longitudinally beyond the second end of the outer column and extending radially outward beyond the radial position of the inner surface of the outer column, and the means for preventing movement of the inner column comprises a second lip located on the intermediate column longitudinally beyond the second end of the inner column and extending radially inward beyond the radial position of the outer surface of the inner column.

4. In a nuclear reactor comprising at least one fuel assembly having fuel members and structural members for spacing and support of the fuel members disposed longitudinally in a path of intended coolant flow, the intended coolant flow defining upstream and downstream direction, a means for preventing downstream motion of the fuel assembly, comprising:

a. a lower end fitting constituting the upstream end of the fuel assembly and connected to the rest of the fuel assembly so as to prevent relative downstream motion of the rest of the fuel assembly with respect to the lower end fitting;

b. a force-transmitting structural member, comprising:

(i) an inner column having a downstream end;
(ii) an intermediate column concentric with the inner column and hollow along at least a part of its length, which part encloses at least part of the inner column;
(iii) means for preventing movement of a point on the inner column with respect to a first point on the intermediate column when an upstream force is applied to the inner column, the remainder of the inner column being free to move with respect to the remainder of the intermediate column, simultaneous expansion of the intermediate column and compression of the inner column thereby being permitted;
(iv) an outer column concentric with the intermediate column and hollow along at least part of its length, which part encloses at least part of the intermediate column, the outer column having an upstream end that engages the lower end fitting so as to prevent downstream motion of the lower end fitting with respect to the upstream end of the outer column;
(v) means for preventing movement of a point on the outer column with respect to a second point on the intermediate column, which second point is located downstream from the first point on the intermediate column, when a downstream force is applied to the outer column, the remainder of the outer column being free to move with respect to the remainder of the intermediate column, simultaneous expansion of the intermediate column and compression of the outer column thereby being permitted;

for transmitting force applied to the downstream end of the inner column to the lower end fitting; and c. means for applying sufficient upstream force to the downstream end of the inner column to hold the fuel assembly in place against downstream force from the coolant, the upstream force thereby being applied through the inner, intermediate, and outer columns to the lower end fitting;

wherein the upstream and downstream movement of the force-transmitting member is restricted only by lower end fitting and the upstream-force means.

5. An apparatus as recited in claim 4, wherein the nuclear reactor comprises a core barrel made of a material having a temperature coefficient of expansion and a lower core plate supported so as to remain stationary with respect to a first point on the core barrel, wherein the fuel assembly is located within the core barrel and oriented so that the lower core plate engages the lower end fitting to prevent upstream motion of the lower end fitting with respect to the lower core plate, and wherein the position of the means for applying an upstream force is determined by a second point on the core barrel, whereby the relative positions of the lower core plate and the means for applying an upstream force are determined by the distance between the first and second points on the core barrel, and wherein the force-transmitting member consists essentially of a material having the same temperature coefficient of expansion as that out of which the core barrel is made.

6. An apparatus as recited in claim 5, wherein the outer column comprises a column having an inner surface and a downstream end, the inner column comprises a column having an outer surface and an upstream end, the means for preventing movement of a point on the outer column comprises a first lip located on the intermediate column downstream of the downstream end of the outer column and extending radially outward beyond the radial position of the inner surface of the outer column, and the means for preventing movement of a point on the inner column comprises a lip located on the intermediate column upstream of the upstream end of the inner column and extending radially inward beyond the radial position of the outer surface of the inner column.

* * * * *